United States Patent [19]
Kang

[11] Patent Number: 5,119,509
[45] Date of Patent: Jun. 2, 1992

[54] LOW NOISE BLOCK DOWN CONVERTER (LNB) FOR THE SIMULTANEOUS RECEIPT OF C/KU-BAND SATELLITE-BROADCASTING

[75] Inventor: Won-Cheol Kang, Seoul, Rep. of Korea

[73] Assignee: SamSung Electronics Co., Ltd., Suwon, Rep. of Korea

[21] Appl. No.: 378,927

[22] Filed: Jul. 12, 1989

[30] Foreign Application Priority Data

Aug. 9, 1988 [KR] Rep. of Korea ............... 88-10190

[51] Int. Cl.$^5$ ............................................. H04B 1/26
[52] U.S. Cl. ................................. 455/328; 455/209; 455/273
[58] Field of Search ............... 455/315, 318, 319, 208, 455/209, 273, 137, 226, 328, 323

[56] References Cited

U.S. PATENT DOCUMENTS

| | | | |
|---|---|---|---|
| 4,384,367 | 5/1983 | King et al. | 455/318 |
| 4,408,348 | 10/1983 | Theriault | 455/315 |
| 4,555,807 | 11/1985 | Bryant | 455/137 |
| 4,661,997 | 4/1987 | Roberts et al. | 455/328 |
| 4,783,843 | 11/1988 | Leff et al. | 455/315 |
| 4,907,003 | 3/1990 | Marshall et al. | 455/12 |

Primary Examiner—Curtis Kuntz
Assistant Examiner—Edward Urban
Attorney, Agent, or Firm—Robert E. Bushnell

[57] ABSTRACT

The invention provides a LNB for the simultaneous receipt of C/Ku-band satellite-broadcasting using a circuit having a C/Ku-band signal-processing stage for providing C/Ku-band signals to the mixer through separate waveguides, low noise amplifiers, band pass filters and impedance matching circuits, local oscillators for converting the output of the C/Ku-band signal-processing stage to the IF signals at mixer using the local oscillation frequency, IF signal processing stage for processing the IF signal of the mixer through the low pass filter (LpF) and the IF amplifier, and a bias stage for supplying dc bias to the low noise amplifiers, local oscillators and the IF amplifiers by the selection of band. The simultaneous receipt of the C-band and Ku-band signals may be attained according to the present invention.

10 Claims, 1 Drawing Sheet

LOW NOISE BLOCK DOWN CONVERTER (LNB) FOR THE SIMULTANEOUS RECEIPT OF C/KU-BAND SATELLITE-BROADCASTING

BACKGROUND OF THE INVENTION

The present invention relates to a low noise block converter (i.e., "LNB") for the simultaneous receipt of C/Ku-band satellite-broadcasting.

The present satellite-broadcasting is carried out using C-band and Ku-band in the U.S.A., and the conventional C-band LNB and Ku-band LNB for receiving these are composed as follows.

The C-band LNB for receipt of a C-band satellite broadcasting signal of a 500 MHZ bandwidth, from 3.7 GHZ to 4.2 GHZ, consists of a band pass wave guide(WR: 229) of 3.7-4.2 GHZ, a low noise amplifier to amplify the probing signal changing abruptly a receiving frequency, a local oscillator of 5.15 GHZ to obtain an intermediate frequency of 950-1450MHZ, a mixer, and intermediate frequency (IF) amplifiers to amplify the IF signal.

And, the Ku-band LNB for receipt of a Ku-band satellite broadcasting signal of a 500 MHZ, bandwidth, from 11.7 GHZ to 12.2 GHZ, consists of a band pass waveguide(WR: 75) of 11.7-12.2 GHZ, a low noise amplifier to amplify the probing signal, a local oscillator of 10.75 GHZ to obtain the intermediate frequency of 950-1450 MHZ, a mixer and IF amplifiers.

Thus, in the past, in order to receive the C-band and Ku-band satellite broadcasting signals, the separate LNBs which have specified frequency performances, that is, 3.7-4.2 GHZ for C-band and 11.7-12.2 GHZ for Ku-band, are required so that the charge to users is increased.

SUMMARY OF THE INVENTION

The present invention has been made in consideration of this and has for one object to provide a LNB for the simultaneous receipt of the C/Ku-band satellite broadcasting.

That is, in the present invention, the biasing circuit and the IF amplifiers are used in common since the IF characteristic of both C and Ku-bands is the same, that is, 950-1450 MHZ.

Also, the mixer provides signals corresponding to the sum and difference of the local oscillating frequency(5.15 GHZ for C-band, 10.75 GHZ for Ku-band) and the receiving frequency(3.7-4.2 GHZ for C-band, 11.7-12.2 GHZ for Ku-band), and it is used in common.

According to the present invention, there is provided a LNB for the simultaneous receipt of C/Ku band satellite-broadcasting comprising: the C/Ku-band signal-processing means for providing C/Ku-band signals to the mixer through separate waveguides, low noise amplifiers, band pass filters, and impedance matching circuits, local oscillation means for converting the output of the C/Ku-band signal-processing means to the IF signals at the mixer using the local oscillating frequency, IF signal-processing means for processing the IF signal of the mixer through low pass filter(LPF) and the IF amplifier, and biasing means for supplying dc bias to the low noise amplifiers, local oscillators and the IF amplifiers by the selection of a band.

DETAILED DESCRIPTION OF THE INVENTION

Figure 1:
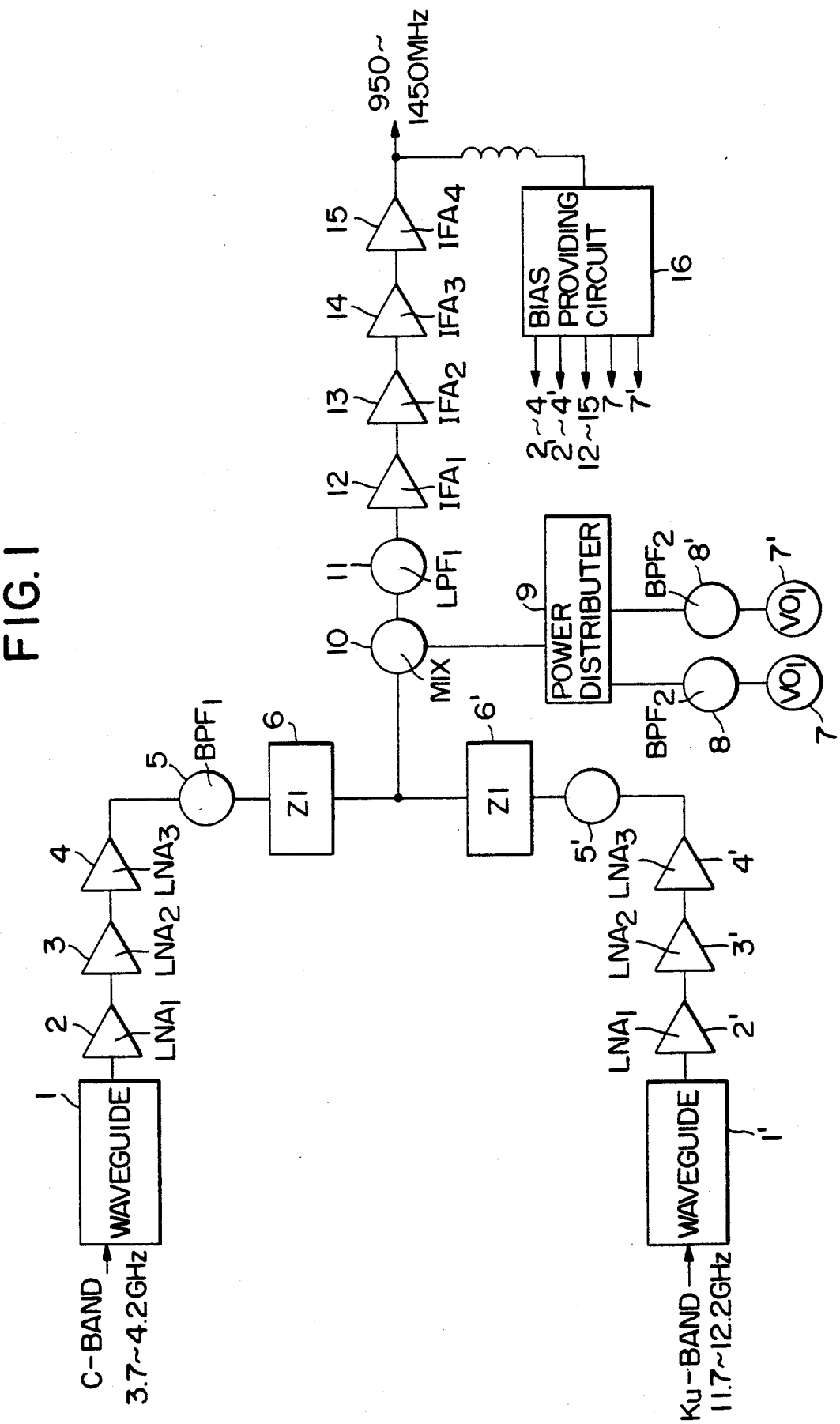
FIG. 1 is a circuit diagram of an embodiment of present invention.

The present invention will be now described in more detail with reference to the accompanying drawing.

FIG. 1 represents an embodiment of the present invention. The C-band satellite-broadcasting signal of 3.7-4.2 GHZ is applied to the mixer 10 through the waveguide 1 made to be set to the receiving frequency, the low noise amplifiers 2-4, a band pass filter 5, and an impedance matching circuit 6. Similarly, the Ku-band signal of 11.7-12.2 GHZ is applied to mixer 10 through the waveguide 1', the three low noise amplifiers 2'-4', a band pass filter 5', and the impedance matching circuit 6'.

And mixer 10 obtains the local oscillating signal according to the receiving frequencies of both bands through band pass filters 8 and 8' connected to power distributor 9 and the local oscillators 7 and 7' and mixes it with both receiving signals, and the IF signal is obtained through a low pass filter 11 and is provided through four IF amplifiers 12-15.

The symbol 16 represents the biasing circuit for providing dc bias to the low noise amplifiers, the IF amplifiers, and the local oscillators.

In the present invention, when receiving the C-band signal, biasing circuit 16 provides dc bias to the three low noise amplifiers 2-4, the local oscillator 7 of 5.15 GHZ, and the four IF amplifiers 12-15. Thus, the C-band receiving signal of 3.7-4.2 GHZ is applied to the three low noise amplifiers 2-4 through the band pass waveguide 1(WR: 229) of 3.7-4.2 GHZ, and the amplified C-band signal is filtered by the band pass filter 5 for the C-band frequencies, and it is applied to mixer 10 through impedance matching circuit 6 for impedance-matching with mixer 10.

On the other hand, the local oscillating frequency of 5.15 GHZ generated by local oscillator 7 for obtaining the IF signal of 950-1450 MHZ about the C-band receiving frequency, is applied to mixer 10 through band pass filter 8 which passes the local oscillating frequency and the power distributor, 9 for distributing equally both local oscillating frequencies according to each band to mixer 10. And the mixer compounds the C-band signal of 3.7-4.2 GHZ with the local oscillating signal of 5.15 GHZ and provides it to low pass filter 11 so that the difference signal of the compound signal components, that is, intermediate frequency signal of 950-1450 MHZ, can be obtained. This difference signal is amplified by the four IF amplifiers 12-15 for satisfying the desired performance of the total system. Also, similarly, when receiving a Ku-band signal, the biasing circuit 16 provides dc bias to the three low noise amplifiers 2'-4', the local oscillator 7' of 10.75 GHZ, and the four IF amplifiers(12-15). Thus, the Ku-band signal of 11.7-12.2 GHZ is applied to the three low noise amplifiers 2'-4' through the band pass waveguide 1' of 11.7-12.2 GHZ, the amplified Ku-band signal is filtered by the band pass filter 5' for the Ku-band frequencies and is applied to mixer 10 through the impedance matching circuit 6' for impedance-matching with the mixer 10.

The oscillating frequency of 10.75 GHZ generated by the local oscillator 7' for obtaining the IF signal of 950-1450 MHZ about the Ku-band receiving frequency, is applied to mixer 10 through the band pass filter 8' which passes the local oscillator frequency via power distributor 9 in the same manner as is above described. Thus, the mixer 10 also compounds Ku-band signal of 11.7-12.2 GHZ with the local oscillating frequency of 10.75 GHZ and provides the difference signal of the compound signal components to low pass filter 11, that is, so that the intermediate frequency signal of 950-1450 MHZ, can be obtained, and the difference signal is amplified by the four IF amplifiers 12-15 for satisfying the desired performance of the total system, and is provided as an output.

In as future, as satellite-broadcasting is extended over the world, and the receiving frequencies of the satellite broadcasting are allocated to each country, the system of the present invention can be changed according to the performances of the receiving frequencies. That is, total concept is not changed, while the low noise amplifier, the mixer, the local oscillator and the IF amplifier must be again designed according to the performances of the receiving frequencies.

As mentioned above, in order to receive simultaneously C-band and Ku-band satellite broadcasting using only one low noise block converter (i.e., an "LNB") then the waveguides, the low noise amplifiers, the local oscillators, the band pass filters, the mixer, and the impedance-matching circuits, are separately installed according to each band, while the bias-supplying circuit and the IF amplifiers are used in common since the intermediate frequency of 950-1450 MHZ is the same, then C-band and Ku-band signals and the oscillating signals generated by the separate local oscillators are compounded in the mixer, respectively, and the same IF signal is obtained through the low pass filter so that the C-band and Ku-band signals can be simultaneously obtained by using only one LNB.

The present invention is in no way limited to the embodiment described hereinabove. Various modifications of the disclosed embodiment as well as other embodiments of the invention will become apparent to persons skilled in the art upon reference to the description of the invention. It is therefore contemplated that appended claims will cover any such modifications or embodiments as fall within the true scope of the invention.

What is claimed is:

1. A low noise block converter for the simultaneous receipt of C/Ku-band satellite-broadcasting, comprising:

C/Ku-band signal-processing means comprising a plurality of waveguides each conducting one of C-band and Ku-band signals, low noise amplifiers for low noise-amplifying a filtered signal from the corresponding ones of said waveguides according to a strobe signal, and an impedance matching means for impedance matching C-band and Ku-band signals in different frequency bands within the amplified signals generated by the low noise amplifiers to provide impedance matched received signals;

local oscillation means including an oscillator, for generating local oscillation signals, and a power distributor for distributing local frequency signals from the local oscillation means to provide said local frequency signals corresponding to the C-band and Ku-band;

mixer means for mixing said impedance matched received signals with the local oscillation frequency signals from said local oscillation means to generate an intermediate frequency signal;

intermediate frequency signal-processing means for processing said intermediate frequency signal from said mixer means; and biasing means for operating in response to the intermediate frequency signal from said intermediate frequency signal-processing means to supply bias voltages to the low noise amplifiers of said C/Ku band signal-processing means, said local oscillator means and said intermediate frequency signal-processing means.

2. A low noise block converter according to claim 1, wherein said power distributor is driven by said local oscillation signals via band pass filters according to each band to provide the local frequency signals to the mixer means.

3. The low noise block converter of claim 1, wherein each of said impedance matching means are connected to provide said impedance matched signals at a common node coupled to said mixer means.

4. The low noise block converter of claim 1, wherein differences between a first one of said local oscillation signals and lower and upper frequencies of said C-band equal differences between a second one of said local oscillation signals and lower and upper frequencies of said Ku-band.

5. The low noise block converter of claim 2, wherein differences between a first one of said local oscillation signals and lower and upper frequencies of said C-band equal differences between a second one of said local oscillation signals and lower and upper frequencies of said Ku-band.

6. A low noise block converter, comprising:
   a first waveguide enabling reception of C-band broadcast signals;
   a second waveguide enabling reception of Ku-band broadcast signals;
   first filter means coupled for passing said C-band broadcast signals;
   second filter means coupled for passing said Ku-band broadcast signals;
   a first impedance matching stage coupled between said first filter means and a first node;
   a second impedance matching stage coupled between said second filter means and said first node;
   said first and second impedance matching stages being connected together at said first node, to said intermediate frequency generating means;
   first local oscillating means for generating a first local frequency;
   second local oscillating means for generating a second local frequency;
   means for distributing said first and second local frequencies;
   means coupled to said first node, for generating intermediate frequency signals by mixing said first and second local frequencies with said C-band and said Ku-band broadcast signals;
   means for selectively supplying electrical power to either said first local oscillating means, or to said second local oscillating means, in dependence upon said intermediate signal; and
   means for filtering and amplifying said intermediate frequency signals.

7. The low noise block converter of claim 6, further comprised of:
   first means coupled between said first waveguide and said first filter means, for amplifying said C-band broadcast signals; and
   second means coupled between said second waveguide and said second filter means, for amplifying said Ku-band broadcast signals.

8. The low noise block converter of claim 7, further comprised of said means for selectively supplying electrical power, providing electrical power to either said said first amplifying means, or to said second amplifying means in dependence upon said intermediate frequency signal.

9. The low noise block converter of claim 7, wherein differences between said first local frequency and lower and upper frequencies of said C-band equal differences between said second local frequency and lower and upper frequencies of said Ku-band.

10. The low noise block converter of claim 8, wherein differences between said first local frequency and lower and upper frequencies of said C-band equal differences between said second local frequency and lower and upper frequencies of said Ku-band.

* * * * *

UNITED STATES PATENT AND TRADEMARK OFFICE
CERTIFICATE OF CORRECTION

PATENT NO. : 5,119,509
DATED : 2 June 1992
INVENTOR(S) : Won-Cheol KANG

It is certified that error appears in the above-identified patent and that said Letters Patent is hereby corrected as shown below:

Column 2, Line 46, delete "the";

Line 56, delete "the"; and

Line 65, delete "the".

Column 3, Line 14, replace "as" (first occurrence) with --the--.

IN THE CLAIMS

Column 4, Line 49, delete "said first and second impedance matching stages";

UNITED STATES PATENT AND TRADEMARK OFFICE
CERTIFICATE OF CORRECTION

PATENT NO. : 5,119,509
DATED : 2 June 1992
INVENTOR(S) : Won-Cheol KANG

It is certified that error appears in the above-indentified patent and that said Letters Patent is hereby corrected as shown below:

Column 4, line 51, delete "intermediate frequency generating means;".

Column 5, line 11, delete "said".

Signed and Sealed this

Twenty-first Day of September, 1993

Attest:

BRUCE LEHMAN

*Attesting Officer*     *Commissioner of Patents and Trademarks*